United States Patent [19]
DuBroff et al.

[11] 3,980,204
[45] Sept. 14, 1976

[54] TRAY DISPENSER APPARATUS

[75] Inventors: Warren DuBroff, Highland Park; Ralph Ettlinger, Jr., Glencoe, both of Ill.

[73] Assignee: Avant Industries, Inc., Wheeling, Ill.

[22] Filed: Oct. 30, 1975

[21] Appl. No.: 627,205

Related U.S. Application Data

[63] Continuation-in-part of Ser. No. 529,846, Dec. 5, 1974, abandoned.

[52] U.S. Cl. ............................. 221/222; 221/297; 221/277
[51] Int. Cl.² .......................................... B65H 3/28
[58] Field of Search ........... 221/222, 221, 289, 295, 221/297, 277, 75

[56] References Cited
UNITED STATES PATENTS

| | | | |
|---|---|---|---|
| 1,663,288 | 3/1928 | Ulrich | 221/297 X |
| 2,795,702 | 6/1957 | Morris | 221/75 |
| 3,057,511 | 10/1962 | Mannhardt | 221/75 |
| 3,250,432 | 5/1966 | Green et al. | 221/289 |
| 3,332,210 | 7/1967 | Tordi | 221/277 X |
| 3,912,124 | 10/1975 | Pinkerton | 221/289 |

*Primary Examiner*—Allen N. Knowles
*Attorney, Agent, or Firm*—McDougall, Hersh & Scott

[57] ABSTRACT

An apparatus for dispensing articles such as cafeteria trays comprising a lower supporting structure upon which a plurality of trays are stacked. An upper supporting structure is provided for holding the stack of trays in a vertical or upwardly extending alignment, and a dispensing opening is defined between the upper and lower supporting structures. A threaded element is adapted to engage the bottom edge of the forward-most tray in a stack and to thereby pivot the tray about the upper supporting member for passing of the tray through the dispensing opening. Means such as a conveyor comprising part of a tray washing machine are positioned for collecting the trays dispensed.

15 Claims, 9 Drawing Figures

TRAY DISPENSER APPARATUS

This application is a continuation-in-part of applicants' copending application Ser. No. 529,846, filed on Dec. 5, 1974, now abandoned.

The construction of this invention generally relates to the handling of articles such as trays of the type used in eating establishments. The invention is particularly concerned with the washing of soiled tableware and with the cleaning of carrying means such as trays which are employed for supporting the tableware.

Many institutions, for example, schools and restaurants, handle large volumes of tableware in providing food service. To provide the greatest efficiency in such large volume institutions, cafeteria-style service is employed. In these operations, persons place plates, saucers, cups, glasses and silverware on a cafeteria tray, and the tray then serves as a carrying means for the tableware.

After a meal is finished, some means must be employed for collecting the soiled tableware and trays so that these items can be washed and reused. The usual practice involves separation of the various items prior to loading into dishwashing equipment. In many instances, certain emloyees have the responsibility of separating and stacking items such as trays, plates, saucers and cups. The same or other personnel will then load these items into racks used for automatic dishwashing equipment, or the items may be loaded directly into conveyors provided in the equipment. During loading into racks or onto conveyors, a separate unstacking operation for items such as plates and trays is involved.

In U.S. Pat. No. 3,605,767, issued on Sept. 20, 1971, there is a disclosure of automatic equipment for handling soiled tableware. In the constructions described, the tableware can be conveyed in random fashion to a vibrating bed or the like and then automatically separated. After separation, the items can be manually, and in some cases automatically, loaded in dishwashing equipment whereby the described system saves considerable time and expense.

U.S. Pat. No. 3,584,752, issued on June 15, 1971, describes specific means for separating soiled tableware from cafeteria trays and the like. The automatic discharge features described are again highly useful for purposes of saving time and handling expense.

After separation of the tableware and trays, the trays are preferably delivered to a washing apparatus. This operation presently involves manual handling of the trays, for example, manual placing of the trays on a conveyor which runs through a washing apparatus. This type of operation leads to certain inefficiencies since a "peak load" operation is generally involved and one or more persons must be utilized for insuring that a regular supply of trays is being washed. Since the conveyor movement is relatively slow, the person manually loading the conveyor will have significant free time between each tray loading step.

In the handling of cafeteria trays, it is the usual practice to stack the trays in a horizontal position after they have been cleaned and the trays are then picked off the stack by persons using the trays. This arrangement involves the necessity for continuously replenishing the stack by adding trays on top leading to different stack heights, and the necessity for individuals responsible for insuring that the use of the trays is watched and stacks replenished. Alternatively, mechanisms are employed which maintain a constant level of a tray stack; however, there is still the necessity for individuals to add a multiplicity of trays to this stack periodically.

Although the foregoing and following description is limited to a discussion of tray handling, it will be appreciated that the apparatus of the invention is capable of handling other articles of similar characteristics. Accordingly, the references to "trays" are considered to include other objects of a planar nature which can be efficiently dispensed with an apparatus of the type to be described.

It is the primary object of this invention to provide an efficient means for the handling of cafeteria trays and the like, particularly with reference to the dispensing of trays.

It is a more specific object of this invention to provide a dispensing apparatus which can be economically produced and which involves a highly reliable and maintenance free operation whereby both the initial cost and maintenance costs can be kept to a minimum.

These and other objects of this invention will appear hereinafter and for purposes of illustration, but not of limitation, specific embodiments of the invention are shown in the accompanying drawings in which.

This invention generally relates to an apparatus for dispensing trays and similar articles wherein the trays are supported on a lower supporting structure. The trays are stacked in a fashion such that the bottom edges of the trays engage the supporting structure with the trays extending upwardly, preferably at an acute angle relative to the vertical. An upper supporting structure in the form of a rod or other stop member engages the stack of the trays whereby in the preferable form of the invention, the stack of trays "leans" against the upper supporting structure.

In one form of the invention, a theaded dispensing element is positioned for engagement with the bottom edge of at least the forwardmost tray in the stack. By providing means for rotating this threaded element, the bottom of the forwardmost tray is moved toward a dispensing opening which is defined between the upper and lower supporting members. This results in pivoting of the tray about the upper supporting member, and when the tray is moved into the dispensing opening, it will drop downwardly. Appropriate guide means are then employed for insuring delivery of the trays, for example to a washing machine in the case of a soiled tray, to an individual in a cafeteria line in the case of a clean tray, or to "tray make-up" line as formed in a hospital.

In an alternative form of the invention, a cam element is positioned for engagement with the bottom edge of the forwardmost tray in a stack. Upon rotation of this cam element, the forwardmost tray is moved upwardly beyond a barrier member and then toward a dispensing opening defined between upper and lower supporting members. This results in dropping of the tray through the opening with appropriate guide means then being employed as previously indicated.

Figure 1:
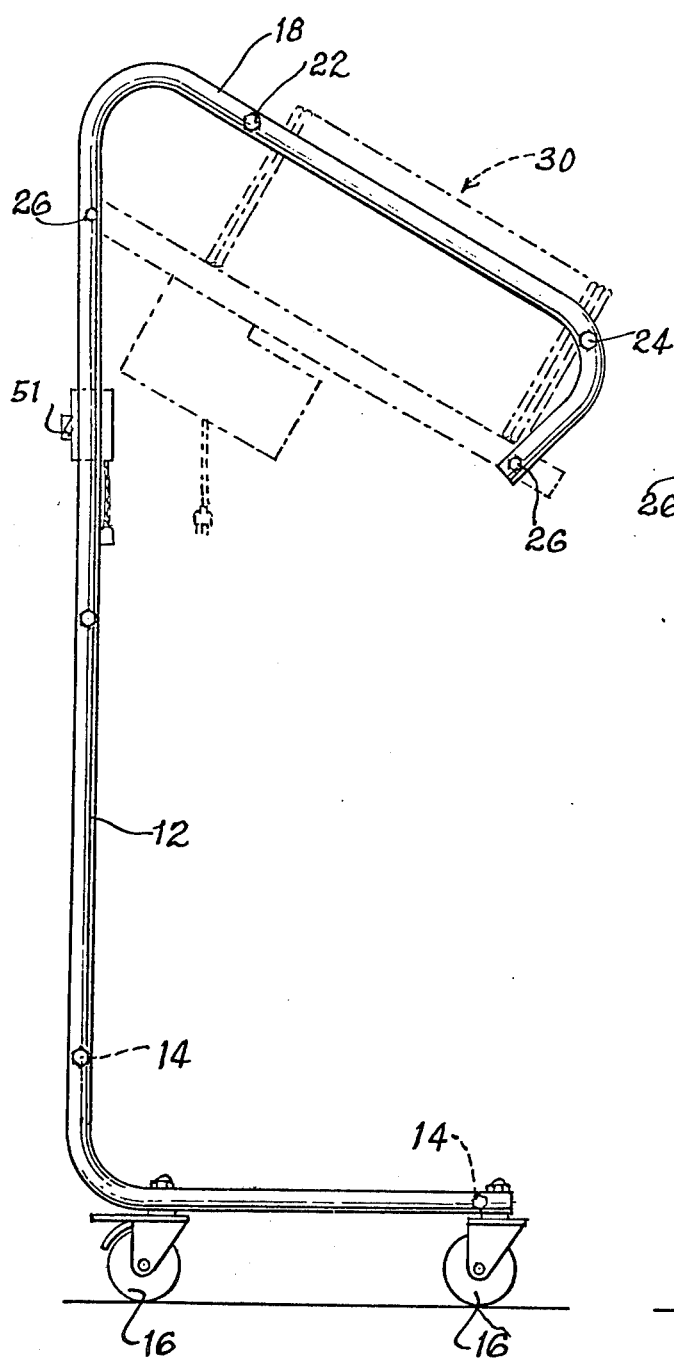
FIG. 1 is a side elevation of a portable support utilized in an apparatus characterized by the features of this invention.
Figure 2:
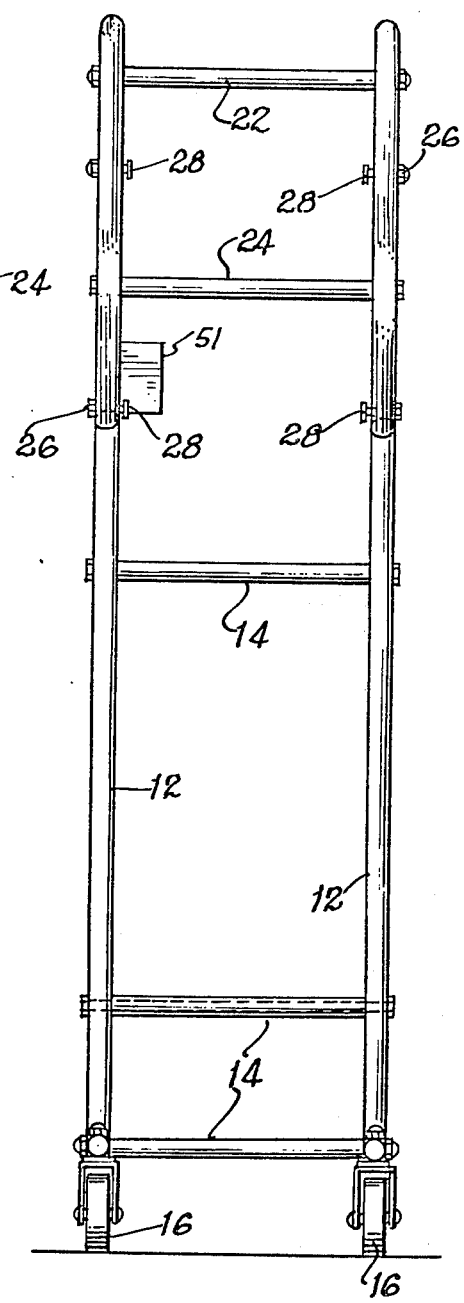
FIG. 2 is a rear elevation of the support.

The accompanying drawing illustrates an apparatus characterized by the features of the invention. In FIGS. 1 and 2 of the drawings, the apparatus comprises a portable support including opposed, upright frame members 12 which are held in assembled relationship by means of transverse members 14. Wheels 16 are provided to facilitate movement of the apparatus from one location to another. This portable arrangement is desirable where the apparatus is to be used at different locations, for example for feeding more than one washing machine, or in instances where the washing machine is not adjacent the tray scrapping operation.

The upper section of the apparatus includes a pair of side frame sections 18 which are held together by means of transversely extending rods 22 and 24. The rods may comprise an inner solid section formed of metal or the like, with an outer tubular covering of polyurethane or other resilient material for wear and noise abatement purposes. Alternatively, solid plastic, plastic pipe, or plastic coated metal may be used.

Each of the side frame sections 18 has a pair of support pins 26 having heads 28 positioned adjacent the inner surface thereof. Those pins provide means for aligning a dispensing unit adapted to be mounted in the apparatus.

One form of dispensing unit for the apparatus comprises a unit 30 including a generally rectangular frame formed of tray supporting members comprising rails 32 and transversely extending braces 34, 35 and 36. The forward brace 34 defines a pair of openings for rotatably receiving the ends 38 of a pair of shafts 40, these shafts extending through aligned openings in the brace 36. Each of the shafts supports a sprocket 42.

Figure 4:
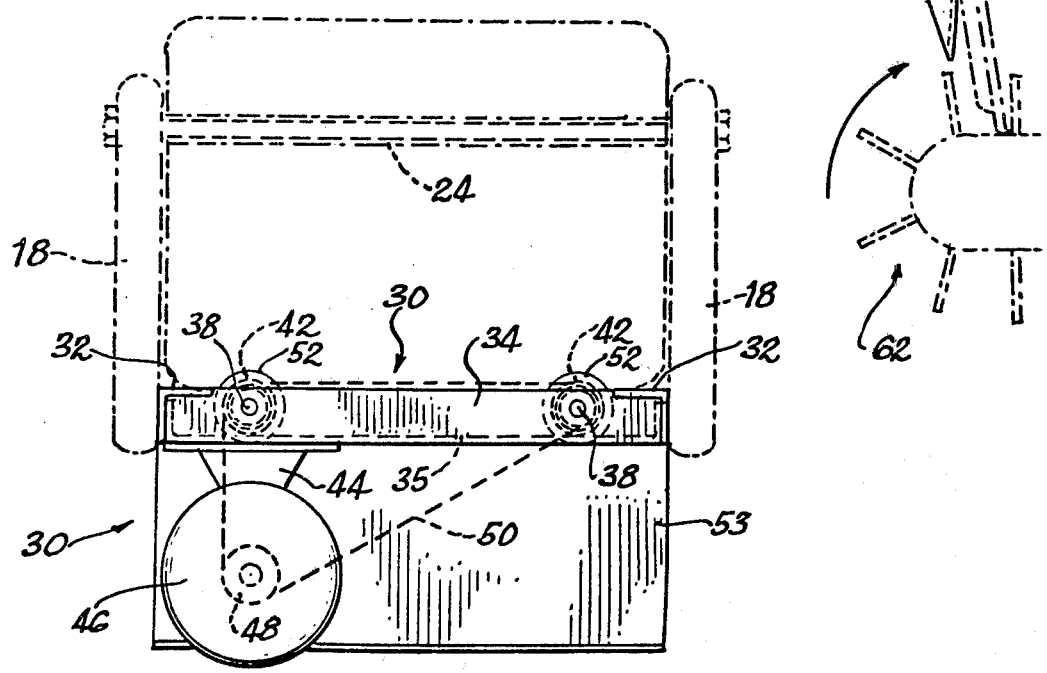
FIG. 4 is a front elevation of the dispenser structure taken about the line 4—4 of FIG. 3.
Figure 5:
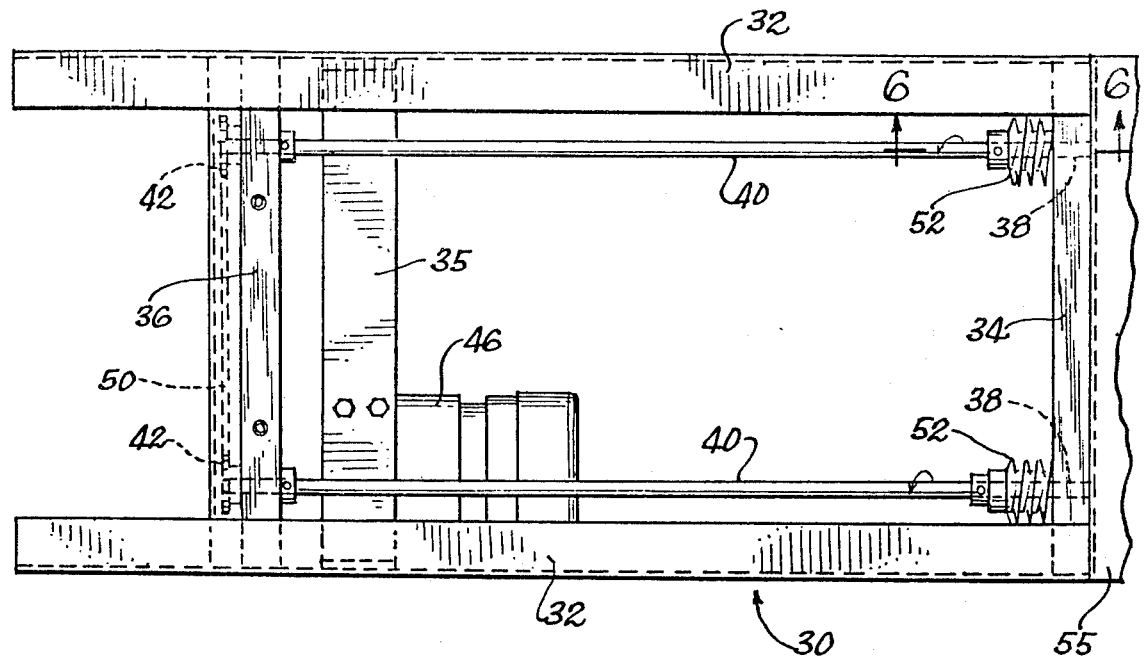
FIG. 5 is a plan view of the dispenser structure.

The brace 35 supports a downwardly extending bracket 44 and the bracket supports a drive motor 46. The drive shaft of the motor carries a sprocket 48, and as best shown in FIG. 4, a drive chain 50 extends between the respective sprockets whereby operation of the motor 46 results in rotation of the shafts 40. As illustrated, a cord 49 leads to a switch 51 employed for controlling the operation of the motor 46. This switch will, of course, be connected to an appropriate power source. A shield 53 is positioned around the drive means for safety purposes.

Figure 6:
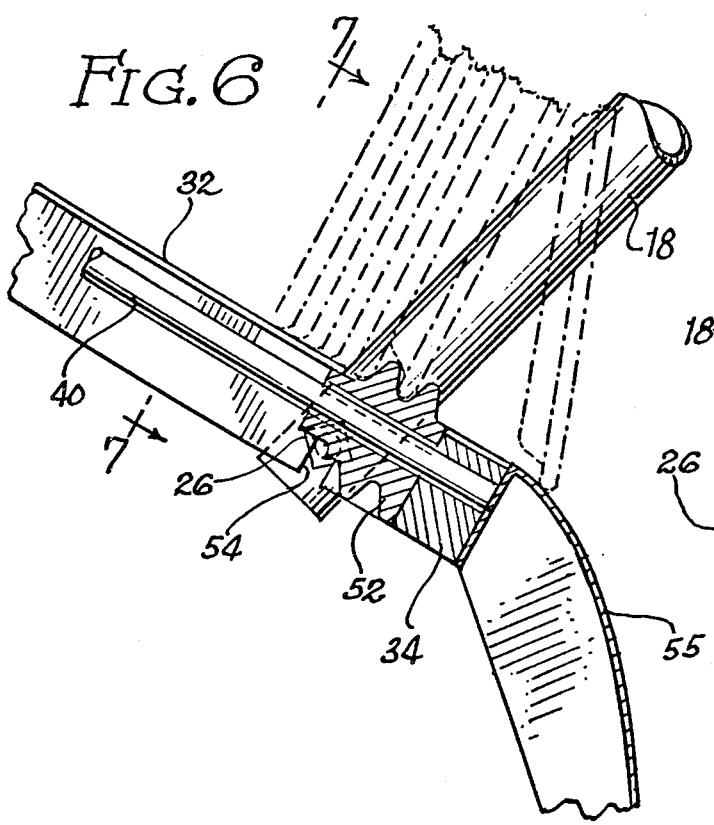
FIG. 6 is an enlarged fragmentary, cross-sectional view of the threaded dispensing means employed in the apparatus.
Figure 7:
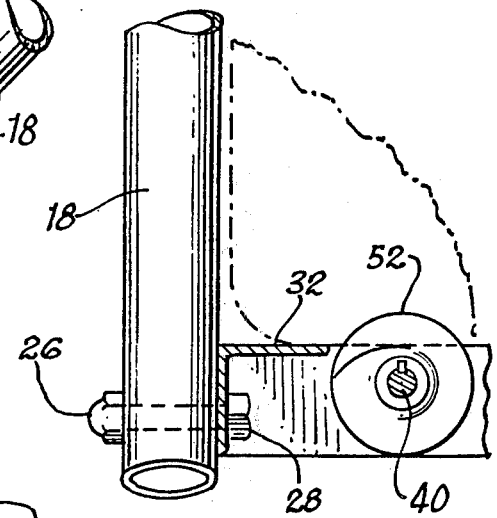
FIG. 7 is a fragmentary view taken about the line 7—7 of FIG. 6.

Each of the shafts 40 has a threaded element 52 attached thereto. The elements 52 are positioned at the forward end of the shafts, and these elements rotate with the shafts. As best shown in FIG. 6, the threads of the elements 52 extend upwardly beyond the supporting surface of the members 32. When a stack of trays is positioned as shown in the drawings, the bottom edges of the trays are supported by the members 32. Because of the gravity forces involved, the forwardmost tray is always urged against the threads of the elements 52, and as these elements rotate, the tray bottoms move forward.

The rails 32 define notches 54 which are received by the pins 26 for supporting the dispenser structure 30. A curved plate 55 is attached to the brace 34 for guiding the discharge of trays, and particularly for controlling the angle of discharge. In the arrangement illustrated, this plate defines a face for engaging each tray dispensed from the apparatus. Beneath the plate there is an illustration of a conveyor structure 62. This conveyor belt may, for example, comprise a belt which runs through a tray washing machine whereby trays dispensed by the illustrated apparatus move directly into such a machine.

Figure 3:
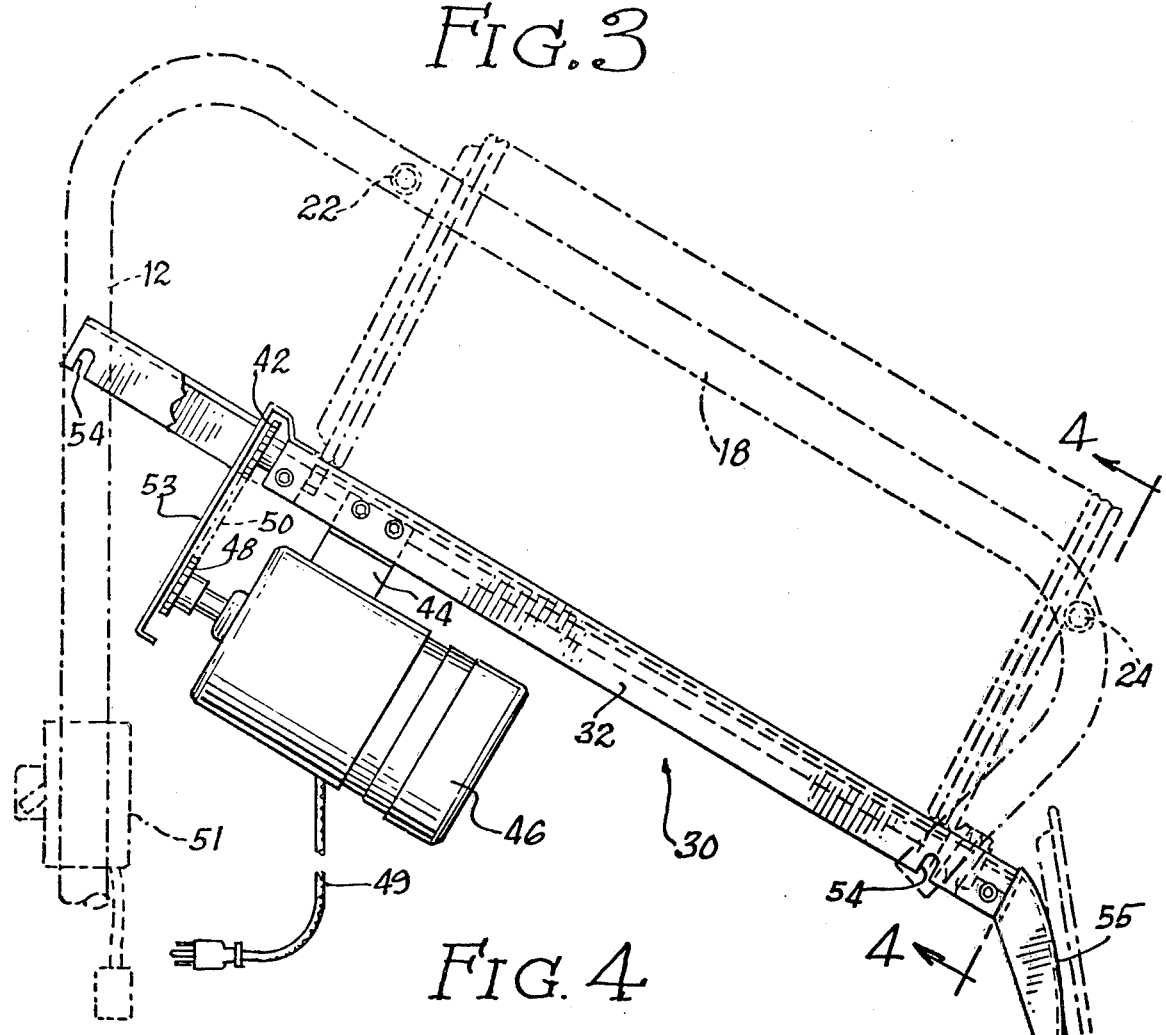
FIG. 3 is a side elevation of a dispenser structure utilized in the apparatus.

As indicated in FIGS. 1 and 3, the frame sections 18 of the portable supporting frame "overhang" the lower frame section. This arrangement is particularly desirable where the structure is moved up against the side or end of a dishwashing apparatus. In that event, it may not be possible to move the lower frame section beneath the apparatus so that the overhang provides a means for dispensing the trays downwardly into the apparatus.

The frame sections 18 are illustrated as being of the same height which permits loading from the top between the rods 22 and 24. It is contemplated that at least one of these frame sections will bend downwardly from the location of the rod 24 and then extend to about the location of the support pins 26 along a line substantially parallel with and adjacent to a rail 32. With this design, the structure can be readily loaded from the side as well as from the top, and this can be accomplished while still providing completely sufficient structural strength.

In the operation of the construction illustrated in FIGS. 1 through 7, trays are stacked on the construction in the manner shown in the drawing. The rod 24 engages the forwardmost tray, and it will be appreciated that this stack is replenished from the rear so that the trays are handled on a "first-in, first-out" basis. Accordingly, in a tray washing operation, a worker can feed the dispensing structure as trays are separated from tableware, and this feeding operation will be independent of the dispensing operation. Thus, a worker may locate several trays on the dispenser during one short period of time and then not add any trays for a following period of time. In the meantime, the dispensing operation can continue on a regular basis as long as there are some trays in place.

Because of the stacking of the trays at the angle illustrated, the trays all tend to move toward the forward end of the construction. With the motor 46 operating, the threaded elements 52 engage the bottom edge of the forwardmost trays and move this bottom edge toward the open end of the apparatus. This results in pivoting of the tray about the rod 24 and once a tray has moved beyond the threaded elements, it will engage the plate 55 to complete the dispensing operation.

It will be appreciated that by controlling the speed of the motor 46, the rate of dispensing can be readily controlled. The motor 46 may be a continuously operating motor; however, it is contemplated that an intermittently operating motor could be utilized, for example, where a particularly slow dispensing cycle is desired, or when the receiving washing machine employs an interrupted or non-continuous conveying system. In the latter case, the washing machine may itself initiate operation of the dispensing cycle by actuating the motor 46 as by means of a suitable switch interlock.

It will also be appreciated that manual operation of the apparatus is easily accomplished by simply providing means for manually rotating the shafts 40. Such manual operation is particularly contemplated where the dispensing apparatus is utilized on a selective basis, for example for dispensing clean trays in a cafeteria line. In that case, a pivoting arm or the like could be engaged by a customer and a common mechanical linkage employed for rotating the shafts 40.

Obviously a pushbutton could also be utilized for actuating motor 46 whenever intermittent dispensing action is desired. In this connection, the threaded elements 52 are preferably designed so that one complete revolution will achieve the dispensing operation. The motor control can, therefore, be such that one actuation of the motor results in a driving time sufficient to accomplish one revolution.

As noted, the dispensing unit 30 simply rests in place on the supporting frame. Since this construction can be lifted up to expose other portions of the apparatus, cleaning of the construction is very readily accomplished. This feature is of great importance in food handling operations.

Figure 9:
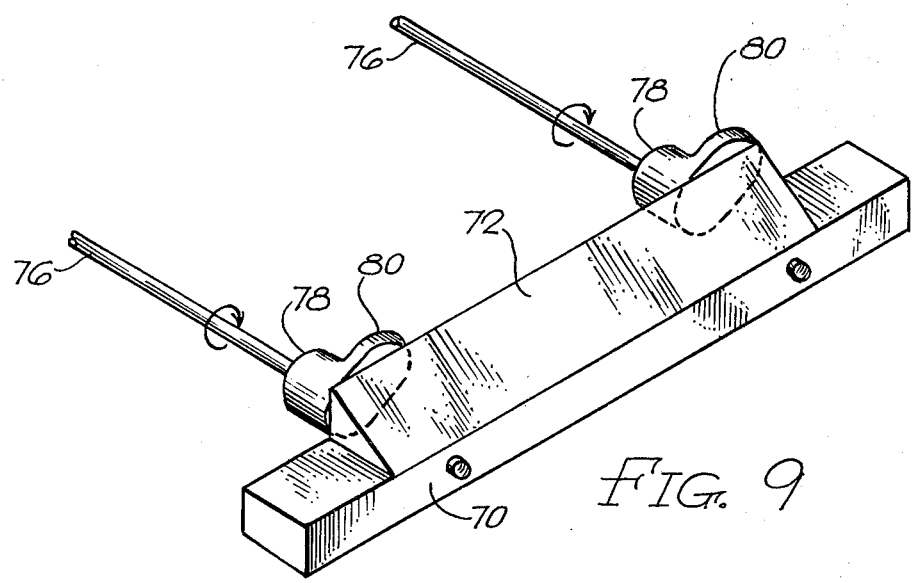
Figure 8:
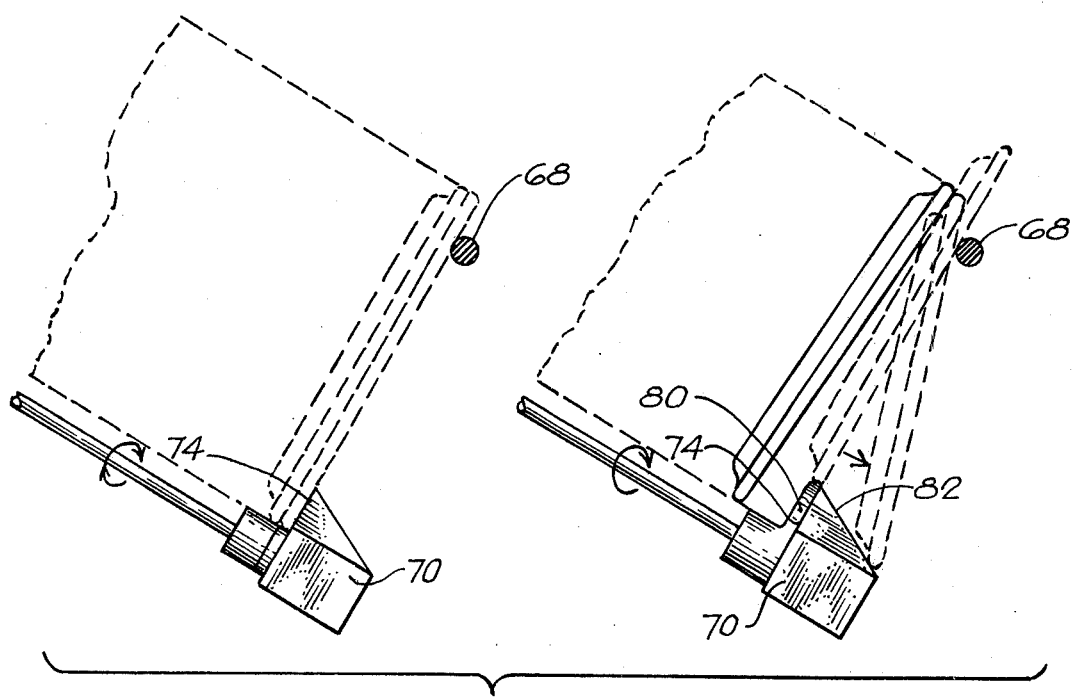
FIG. 8 is a fragmentary side elevation illustrating a modified form of the invention in two stages of operation; and, FIG. 9 is a fragmentary perspective view of this modified form.

FIGS. 8 and 9 illustrate a modified form of the invention. In considering this form, it will be understood that the use of frame members 12, 14 and 18, or some similar supporting structure is contemplated. In addition, the invention contemplates the use of lower supporting rails 66 of a structure comparable to that of the rails 32. An upper supporting rod 68 comparable to the rod 24 is also utilized.

A transversely extending lower brace 70 is utilized in this embodiment. This brace carries an upwardly protruding sloped section 72 defining a stop face 74 which engages the forwardmost tray in a stack. In considering FIG. 8, it will be appreciated that the face 74 in combination with the rod 68 prevents movement of trays into the opening defined between these elements.

A pair of drive shafts 76 are adapted to be driven in the manner described with respect to the shafts 40. Each of these shafts carries a cam element 78 with each element including a tray edge engaging portion 80. This edge engaging portion is of a thickness corresponding with a tray rim thickness.

In the fashion of the embodiment previously described, trays handled by the construction of FIGS. 8 and 9 are supported on rails 66. Upon imparting of driving movement to the shafts 76, the cam sections 80 engage a tray for driving a tray upwardly beyond the edge of the section 72 of brace 70. The length of the cam section 80 is such that each tray will necessarily be lifted sufficiently to achieve the dispensing action. It will be noted that the section 72 of the brace 70 defines a sloped surface 82 to facilitate dispensing movement once a tray has been lifted beyond the edge of the stop face 74. The trays will, of course, drop by gravity at this point.

It will be appreciated that the described constructions do not include any elements of complex design so that the constructions can be economically manufactured. Furthermore, maintenance expenses are necessarily kept to a minimum in view of the simplified arrangement for cleaning and in view of the fact that there are no complex elements included in the combinations described.

When considering alternative uses of the apparatus, it should be noted that the direction of movement of trays through the dispensing opening can be controlled. Specifically, the angle of the supporting members 32 or 66 relative to the horizontal and the angle of the trays relative to these supporting members can be varied. In the embodiment illustrated, the movement of the trays is substantially vertically downwardly; however, by varying the angles referred to, the trays can be caused to fall at an angle relative to the vertical. The trays could, thus, be caused to automatically assume a horizontal position after coming to rest with either the top or bottom of the trays facing upwardly.

It will be understood that various changes and modifications may be made in the structure described which provide the characteristics of the invention without departing from the spirit thereof particularly as defined in the following claims.

That which is claimed is:

1. An apparatus for dispensing trays comprising a lower supporting member for supporting the bottom edges of a plurality of trays, an upper supporting member, a dispensing opening defined between said supporting members, at least one dispensing element, said element comprising a short section being positioned adjacent said opening and engaging the bottom edge of at least the forwardmost tray, means for driving said element upwardly whereby said bottom edge is moved by said element off the lower supporting member and toward said dispensing opening, said movement resulting in the pivoting of said tray about said upper supporting member and in movement of said tray through said opening, and means for collecting said tray.

2. An apparatus in accordance with claim 1 wherein a rotating drive is provided for said dispensing element.

3. An apparatus in accordance with claim 2 wherein said dispensing element comprises a short threaded member.

4. An apparatus in accordance with claim 2 wherein said dispensing element comprises a cam defining an engaging portion having a thickness sufficient to engage the bottom edge of the forwardmost trays for imparting driving movement to the tray independent of the other trays.

5. An apparatus in accordance with claim 2 wherein said lower supporting member defines an elongated supporting surface which is inclined downwardly toward said dispensing opening, the trays being gravity fed along said lower supporting member as trays are dispensed from the apparatus.

6. An apparatus in accordance with claim 5 wherein said lower supporting member comprises a pair of spaced apart rails, said dispensing element being located between said rails.

7. An apparatus in accordance with claim 6 wherein said upper supporting member comprises a transversely extending rod.

8. An apparatus in accordance with claim 7 including a pair of side frames for confining trays positioned in the apparatus, said rod extending between said side frames, and one of said rails being positioned adjacent each side frame.

9. An apparatus in accordance with claim 8 including a wheeled carrier including said side frames and associated supporting members whereby said apparatus is adapted for movement to different locations.

10. An apparatus in accordance with claim 2 wherein said dispensing element is mounted on a drive shaft, and including a motor for rotating said drive shaft to achieve the dispensing action.

11. An apparatus in accordance with claim 2 wherein each tray drops downwardly after moving through said opening, and including guide means positioned by said opening for directing a tray to said means for collecting the trays.

12. An apparatus in accordance with claim 6 including a motor carried by said frame for rotating said drive shaft.

13. An apparatus in accordance with claim 12 wherein said frame is removably supported whereby the frame, motor and other associated elements can be lifted from the apparatus as a unit.

14. An apparatus in accordance with claim 10 wherein a pair of said shafts are mounted on opposite sides of the construction adjacent the opposite sides of said lower supporting member, a dispensing element being mounted on each shaft.

15. An apparatus in accordance with claim 4 including a stop member mounted in the path of the lower portions of said trays, said cam engaging portion moves the lower portion of the forwardmost tray upwardly over the top edge of said stop member.

* * * * *